Figure 1:
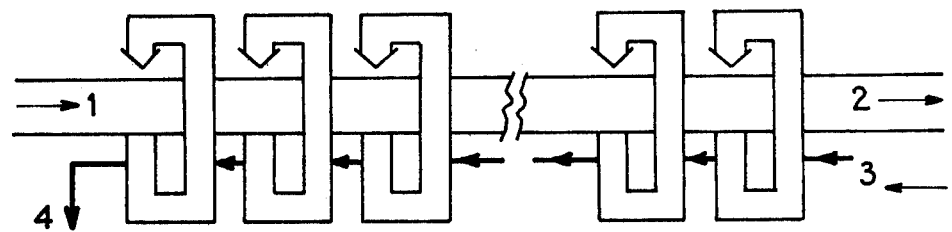

United States Patent [19]

Pollozec et al.

[11] 4,184,891
[45] Jan. 22, 1980

[54] PROCESS FOR WASHING A SOLID SUBSTANCE IMPREGNATED WITH A LIQUID SUBSTANCE

[75] Inventors: François A. Pollozec; Michel Nouaillant, both of Bergerac, France

[73] Assignee: Societe Nationale des Poudres et Explosifs, Paris, France

[21] Appl. No.: 805,792

[22] Filed: Jun. 13, 1977

[30] Foreign Application Priority Data

Jun. 16, 1976 [FR] France .................. 76 18225

[51] Int. Cl.² .............................. B08B 7/04
[52] U.S. Cl. ............................ 134/10; 8/158; 134/26; 134/32; 134/34
[58] Field of Search ............... 134/10, 25 R, 26, 28, 134/32, 34; 68/205 R; 8/158, 151.2

[56] References Cited

U.S. PATENT DOCUMENTS

| | | | |
|---|---|---|---|
| 2,686,192 | 8/1954 | Bonotto | 134/25 R X |
| 2,949,337 | 8/1960 | Oldershaw | 8/151.2 |
| 3,117,031 | 1/1964 | Griffiths | 134/25 R |
| 4,017,343 | 4/1977 | Haas | 134/10 X |
| 4,039,349 | 8/1977 | Kwasnoski et al. | 134/10 |

Primary Examiner—Marc L. Caroff
Attorney, Agent, or Firm—Buchnam and Archer

[57] ABSTRACT

A solid product impregnated with a liquid substance is subjected to successive washing operations in a washing zone by a process wherein:

the successive washing operations are carried out with a washing liquid the content of the substance to be eliminated therein decreasing from the first washing operation towards the last washing operation;

a small quantity of liquid rich in the substance to be eliminated is removed from the washing liquid used during the first washing operation and an equivalent amount of the liquid free of the substance to be eliminated is introduced into the washing liquid used during the last washing operation;

during each washing operation a substantial quantity of washing liquid is used, the greater quantity of this liquid being recovered and with the exception of the first washing operation, a small quantity of this washing liquid is transferred into the washing liquid corresponding to the washing operation at the immediately lower level whereby the content of the substance to be eliminated is maintained constant in each washing operation.

The process may be carried out continuously or discontinuously.

3 Claims, 5 Drawing Figures

PROCESS FOR WASHING A SOLID SUBSTANCE IMPREGNATED WITH A LIQUID SUBSTANCE

The present invention relates to processes and apparatuses for washing a product impregnated with one substance which must be eliminated. More specifically, the present invention relates to processes and apparatuses for washing nitrocellulose which is prepared by reaction of cellulose with a nitrating mixture of sulfuric and nitric acid.

The process of nitration of cellulose requires substantial amounts of the mixture of sulfuric and nitric acid with the nitration ratio, that is the ratio of the weight of cellulose to the weight of the nitrating bath, varying between 1/35 and 1/50 depending upon the type of nitrocellulose being manufactured. The order of magnitude of the yield of the nitration reaction (weight of nitrocellulose/initial weight of cellulose) is about 1.6, with the nitrocellulose remaining immersed at the end of the reaction in substantial quantities of the waste acids. These waste acids may be concentrated and it is, therefore, possible to recover a substantial amount by centrifugation by means of continuous or discontinous driers.

However, it is not possible to recover the total amount of the acids and after drying there remains a substantial quantity of acids which impregnate the product, the proportion of the acids to be removed (TEA), which represents the percentage by weight of the acids carried by the nitrocellulose in relation to the nitrocellulose, itself, varying between 150 and 70%, according to the nitrogen content. It is, therefore, necessary to free the nitrocellulose of these acids by several washings after the reactions.

When nitrocellulose is washed with an acidic solution of given concentration, the acid tends to attach itself to the nitrocellulose fibers and the decrease of the acid concentration in the solution which impregnates the nitrocellulose is a function which depends on two factors. One factor is that the function increases depending upon the ratio of the amount of the liquid being used for the washing/amount of product to be washed. Another factor is the difference in concentration between the solution which impregnates the nitrocellulose and the liquid used for the washing.

In order to wash nitrocellulose it is well-known to immerse the nitrocellulose in a great quantity of water for the purpose of stopping the reaction of nitration which to some extent is reversible and for the purpose of subjecting the product to one or more washings. In this case the difference in concentration between the solution which impregnates the nitrocellulose and the liquid used for the washing is the maximum and it is fixed and only the parameter which consists of amount of washing liquid/amount of product being washed may be varied. It is, therefore, necessary to use substantial amounts of water in order to extract the acid and the acid is obtained in a very dilute form. As a result, it is impossible to recover the acid from the water and this leads to substantial difficulties because the aqueous solution has to be discarded, a fact which leads to pollution of the environment.

A washing process is also known which is carried out counter-currently and permits to recover acids in a much more concentrated form, the quality of washing being equivalent. This process consists of reducing the amount of the water used by carrying out several washings, the acidic water which has served in the n stage of washing becoming the washing liquid for the n-1 washing stage. According to this process it is possible to affect the parameter, which consists of the total amount of washing/amount of nitrocellulose while fixing the amount of water, by introducing a new parameter, that is the number of washing stages. However, the number of washing stages is not an independent parameter and every increase of this number reduces in each washing stage the difference in concentration between the washing liquid and the solution which impregnates the product. Each supplemental washing decreases the effectiveness of the other washings and one notes that after six washings any supplemental washing does not increase the yield.

The crux of the present invention resides in a novel washing process which does not present the disadvantages of the conventional processes because it permits to make the ratio of the total amount of washing liquid with respect to the amount of the product independent from the number of washings and independent from the amount of washing liquid at the entry of the apparatus used for washing.

The object of the present invention is to provide a process for washing a solid product impregnated with a substance which must be removed, which process may be carried out continuously or discontinuously. The substance which must be recovered may be either a liquid compound or a solution of a soluble substance.

The washing process according to the present invention consists of subjecting the product to be washed to a sequence of successive washing operations in a washing zone and the process comprises the following features:

During the course of the same sequence the successive washing operations are carried out with liquids in which the content of the substance to be eliminated decreases from the first operation towards the last operation.

During each sequence a small quantity of the liquid rich in the substance to be eliminated is extracted from the liquid used for the washing during the first washing operation and an equivalent quantity of the liquid free of the substance to be eliminated is introduced into the washing liquid which is used during the last washing operation.

During each washing operation of the same sequence a substantial amount of the washing liquid is used, the greater amount of this liquid being recovered in order to carry out the washing operation of the same level during the following sequence and except for the first and the last washing operations, a small quantity of this washing liquid is transferred into the washing liquid corresponding to the washing operation of the immediately lower level. In this matter the content of the substance to be eliminated in the liquid remains constant for the following sequence.

The process according to the present invention may be carried out continuously or discontinuously. When the process is carried out continuously, the product to be washed undergoes each washing operation of the sequence in a particular washing zone, with the product being successively treated in each particular zone. This manner of continuous operation of the process according to the present invention is schematically illustrated in FIG. 1.

The process consists of letting the product impregnated with the substance to be eliminated designated by numeral 1 circulate through a plurality of successive washing zones from the first zone towards the last one and removing the purified product designated by numeral 2 from the last zone. The process is characterized by the following features:

1. In each zone the washing is carried out with a great amount of the liquid which is essentially totally recycled in the same zone forming therefore, a washing circuit.
2. The amount of the substance which is being eliminated in the washing liquid of each zone is greater than the amount of the substance in the washing liquid in the following zone.
3. A small amount of the washing liquid, which is designated by numeral 3 free of the substance to be eliminated is introduced into the washing circuit of the last zone.
4. A small amount of the liquid circulates counter-currently from the last zone to the first zone and this portion establishes a communication between the successive washing circuits and permits to maintain the content of the substance to be eliminated constant in the washing liquid of each circuit.
5. In each washing zone the small amount of the liquid which flows counter-currently enters the washing circuit at a point upstream of the point where the washing liquid is placed in contact with the product and downstream of the point where the small amount of liquid flowing counter-currently is removed, which liquid is directed towards the preceding washing zone, the flow being counter-current in relation to the direction of movement of the product.
6. A small amount of the liquid designated by numeral 4 which contains a high content of the substance to be eliminated is extracted from the washing circuit of the first washing zone.

Figure 2:
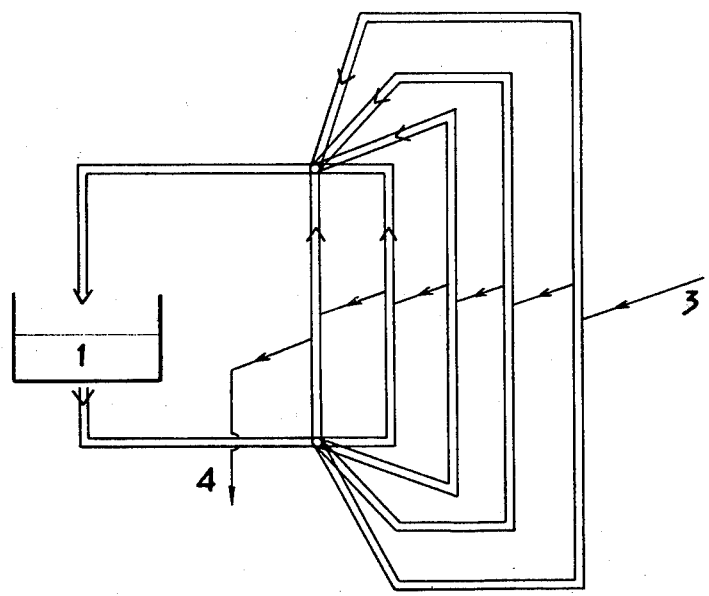

When the process in accordance with the present invention is carried out discontinuously, the product to be washed is subjected to a plurality of successive washing operations in a single washing zone. This manner of operation of the process according to the invention is illustrated schematically in FIG. 2. It consists of introducing the product to be washed 1 into a washing zone and allowing the product to undergo in this zone a sequence of several washing operations in which:

1. The content of the substance to be eliminated present in the liquid used in any one of the washing operations is superior to the content of the substance in the washing liquid used for the following washing operation.
2. Each washing operation is carried out with a substantial amount of washing liquid which is essentially totally recovered for carrying out the washing at the same level during the subsequent sequence, while a small amount of this washing liquid is transferred into the washing liquid corresponding to the preceding washing operation in order to maintain constant the content of the substance to be eliminated.
3. In the course of each sequence a small quantity of the washing liquid free of the substance to be eliminated is introduced into the washing liquid corresponding to the last washing operation and a small quantity of the washing liquid rich in the substance to be eliminated, designated by numeral 4, is removed from the washing liquid corresponding to the first washing operation.

The purified product designated by numeral 2 is extracted from the washing zone at the end of the washing sequence, and a new batch of product to be washed is introduced into the washing zone in order to undergo the sequence of the washing stages.

The process in accordance with the present invention may be carried out to wash a great number of products impregnated with a substance to be eliminated in every instance in which this washing, in accordance with conventional washing processes requires the utilization of substantial quantities of the washing liquid. Among these products one may list by way of example:

fibrous products which ordinarily are collected in the mother liquid after they have been prepared and particularly nitrocellulose in the form of fibers obtained by reaction of a mixture of sulfuric and nitric acid with cellulose, which nitrocellulose is impregnated with a substantial quantity of acids;

crystalline products to be separated from the respective mother liquids;

products obtained in a granulated form and particularly nitrocellulose plasticized in the form of granules which contains traces of solvents and emulsifiers which make the product unstable.

The process according to the invention is particularly suitable for washing nitrocellulose obtained in the form of fibers impregnated with sulfuric and nitric acid. In accordance with this invention it is possible to increase at each washing operation the ratio of the amount of the washing liquid with respect to the amount of washed product without introducing excessive quantities of the washing liquid into the washing apparatus. Further the process is carried out without reducing the difference between the quantity of the substance to be eliminated in the product and the same substance present in the washing liquid so that the efficiency of the washing operation may be improved. These two advantages result from the fact that the washing is carried out in a quasi closed circuit and from the fact that a small quantity of the washing liquid is transferred from one washing operation towards the preceding washing operation.

Another object of the present invention is to provide two apparatuses which permit to carry out the process according to the present invention, one in a continuous fashion and the other in a discontinuous fashion.

The apparatus for continuous washing consists of several washing zones and is characterized by the following:

a. In each washing zone a nozzle provided with a device for dispersing the washing liquid in fine drop form is connected by means of a system of pipes and a storage reservoir to a recovery tank which is fed through the product to be washed in such a manner as to form a quasi-closed circuit.
b. Each quasi-closed circuit is connected to the adjacent circuits in such a manner as to achieve a small circulation of the liquid between the circuits arranged in series.
c. The apparatus is provided with a device which permits the product to be washed to circulate continuously under the nozzles through which the liquid in the form of fine drops is introduced through the successive washing zones.
d. The inlet for the product to be washed and the outlet for the washing liquid are located on a level with the first washing circuit.

e. The outlet of the purified product and the inlet of the washing liquid free of the substance to be eliminated are located on a level with the last washing circuit.

Figure 3:
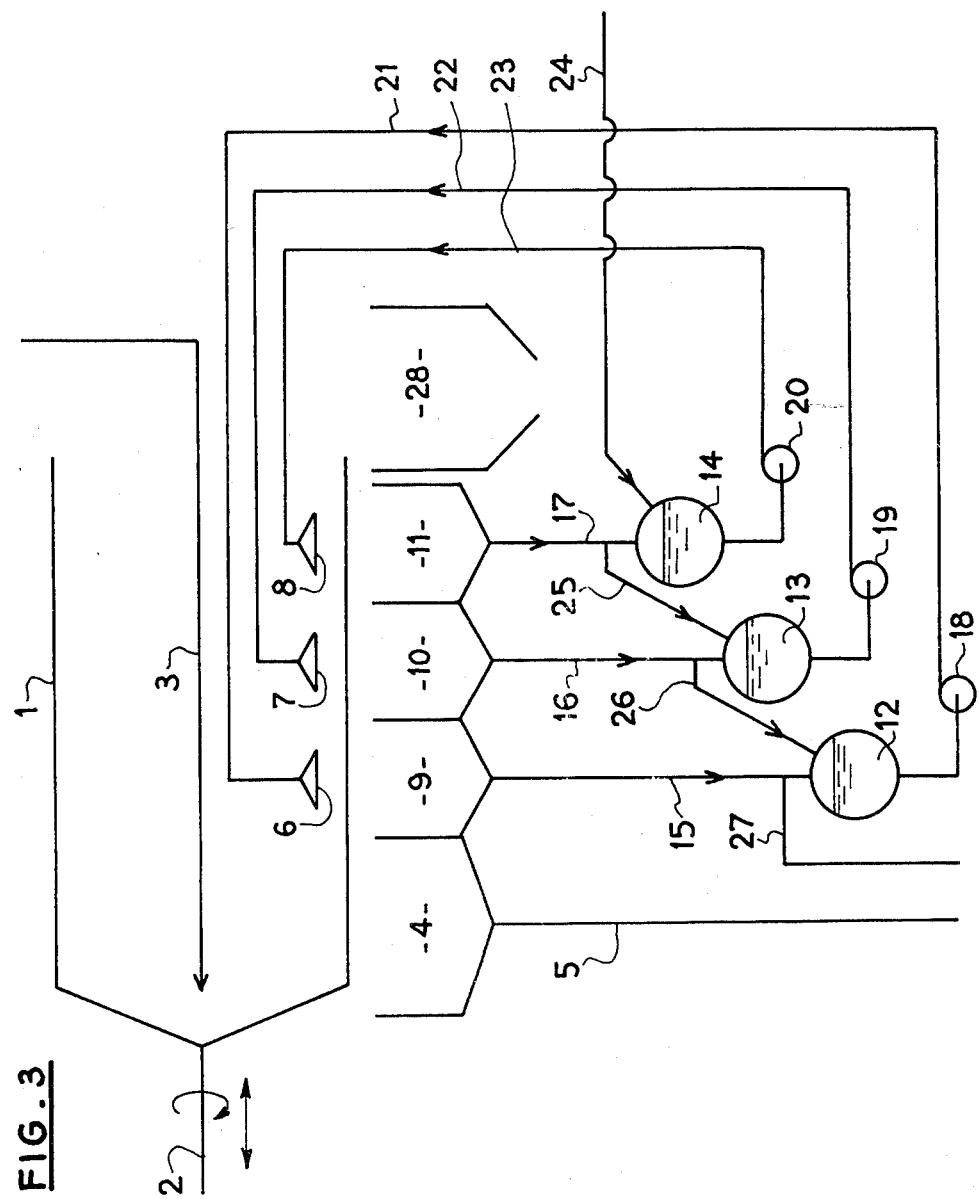

According to a preferred embodiment of the invention the device which permits the product to be washed to be circulated consists of a drier capable of a rotation motion around its axis and provided with a mechanical extraction device. This apparatus is shown in FIG. 3.

The apparatus consists of a drier designated by numeral 1 capable of rotation around its axis 2 and provided with means for extraction. The product impregnated with a substance to be eliminated is introduced into drier 1 through conduit 3 along the axis of the drier. The product reaches the bottom of the drier from which point it is separated by a mechanism of extraction. The product falls then on the bottom of the drier where it undergoes a first drying step setting free the substance which has impregnated the product in a concentrated form which flows through reservoir 4 and which is collected by means of conduit 5. Due to the extraction mechanism of the drier 1, the product advances along the wall of the drier and passes under the liquid dispersion nozzles 6, 7 and 8. The washing liquid is sprayed by means of nozzles 6, 7 and 8 on the product and it is then extracted by centrifugation. The washing liquid is introduced into the recovery tanks 9, 10 and 11 and it is then transferred into reservoirs 12, 13 and 14 respectively through the intermediate conduit 15, 16 and 17. The washing liquid is introduced from the storage reservoirs to the nozzles by means of pumps 18, 19 and 20 through conduits 21, 22 and 23. The washing liquid freed of the substance to be eliminated is introduced in a small quantity into the storage reservoir 14 through conduit 24. A small amount of the washing liquid is withdrawn through conduit 17 and it is introduced into reservoir 13 through conduit 25. Similarly a small amount removed along conduit 16, is led into reservoirs 12 through channel 26. A small amount of the washing liquid in very concentrated form with respect to the substance to be eliminated is removed from conduit 15 through conduit 27. The product purified at least partially, of the substance to be eliminated falls into reservoir 28.

It is equally possible to use two driers in series operating in the same manner as described hereinabove. The first drier is fed with a product which is substantially contaminated and with a washing liquid which contains the the substance to be eliminated withdrawn from the second drier so that one obtains a partially purified product together with a liquid which is enriched of the substance to be eliminated. The second drier is fed with a partially purified product and a washing liquid free of the substance to be eliminated so that one obtains a purified product.

The washing apparatus used when the process is carried out discontinuously comprises only one washing zone and is characterized by the following:

a. The washing zone is provided with a device which permits to disperse the washing liquid over the product to be washed and with a system for letting the washing liquid flow.

b. Several groups of plugged tanks and reservoirs are arranged in parallel in the exterior of the washing zone between the dispersion device for the liquid and the flow system, with the tank and the reservoir of one group being connected by means of a valve, each group being capable to be placed out of the circuit by means of the valves, the total number of the groups corresponding to the number of washing operations.

c. The tank of every one of the groups is connected to the tank of the preceding groups by means of a pipe provided with a valve, except for the first and the last tank, the first tank being provided with an exit and being connected to the second by means of a conduit provided with a valve, while the last tank is connected with the tank next to the last one and is provided with an inlet conduit.

Figure 4:
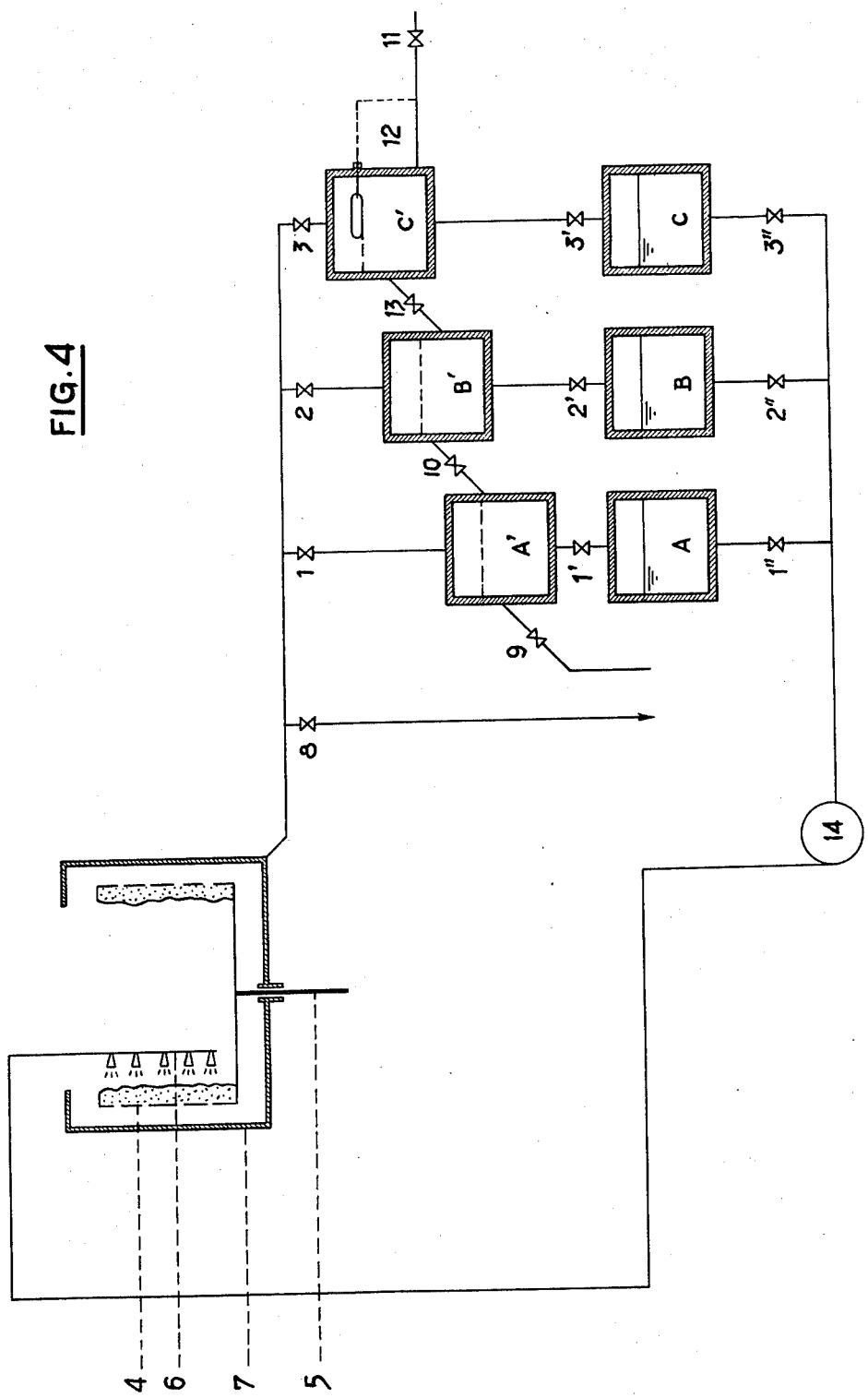

FIG. 4 illustrates an apparatus suitable for carrying out the process in a discontinuous fashion according to the present invention.

In this apparatus the washing zone consists of a discontinuous drier designated by numeral 4 which rotates around its vertical axis 5 and which is provided with a device for the dispersion of the liquid designated by numeral 6 and a recovery tank 7. The conduit from the tank 7 and the conduit which feeds the dispersion system 6 are connected by means of three groups of structures: valves 1, 2 and 3; plugged tanks A', B' and C', valves 1', 2' and 3' reservoirs A, B and C and valves 1", 2" and 3". As shown in the figure the three groups of structures are arranged in parallel.

Upstream of the valves 1, 2 and 3 and downstream of the recovery container 7 is located a conduit which is provided with valve 8. Tank A' is provided with a conduit which has valve 9 and it is connected to tank B' by means of a conduit provided with valve 10. Tank C' is provided with a conduit which has valve 11, a float gauge 12 which permits to regulate the level. Tank C' is connected to tank B' by means of a conduit which is provided with valve 13. A pump designated by numeral 14 is located on the conduit which feeds the liquid dispersion system downstream of the valves 1", 2" and 3".

A drying and washing cycle is carried out in the following manner by means of the apparatus described hereinabove:

the product to be washed is introduced into the drier;

the product undergoes a drying step during which only valve 8 is open. A substantial amount of the liquid which impregnates the product flows through valve 8.

the product undergoes a first washing step during which valves 1 and 1" are open. The washing liquid from reservoir A is transferred by means of pump 14 up to the liquid dispersion system. It is led from the recovery container 7 through valve 1 into tank A' where it is stored.

the product undergoes a second washing operation. Only valves 2 and 2" are open. The product undergoes a third washing operation. Only valves 3 and 3" are open.

a volume v is removed from container A' through valve 9 which is the only open valve.

a volume v is removed from tank B' into tank A' and only valve 10 is open.

a volume v is transferred from container C' to container B' and only valve 13 is open.

a volume v of the washing liquid free of the substance to be eliminated is introduced into reservoir C' and during this stage only valve 11 is open.

the sequence of washing operation terminates with the opening only of valves 1', 2' and 3' in such a manner as to fill the tanks A, B and C in view of the following washing sequence and the washed product is removed from the drier 4.

The washing liquid has the greatest content of the substance to be eliminated in reservoir A and the smallest in reservoir C.

It is manifest that it is possible to increase the number of washing operations by increasing the number of the groups valve-plugged-tank-reservoir-valve which are arranged in parallel.

The advantages of the process according to the present invention may be appreciated from a comparison of the results obtained according to the different processes for washing nitrocellulose, the latter being obtained by reaction of cellulose with an excess of the mixture of sulfuric and nitric acid in the order between 3500 and 5000%. The nitrocellulose after drying has an acid content between 70 and 150%.

The first series of experiments has been carried out in accordance with the conventional process. Equivalent quantities of nitrocellulose impregnated with the water containing the acid are immersed in different volumes of water.

A second series of experiments has been carried out by washing counter-currently.

A third series of experiments has been carried out by the process according to the present invention using a discontinuous drier of the type used in a laboratory.

The experiments in which counter-current washing is carried out and the experiments according to the invention have been carried out by allowing the number of washing operations to vary and by varying the amount of water at the inlet of the washing apparatus.

Figure 5:
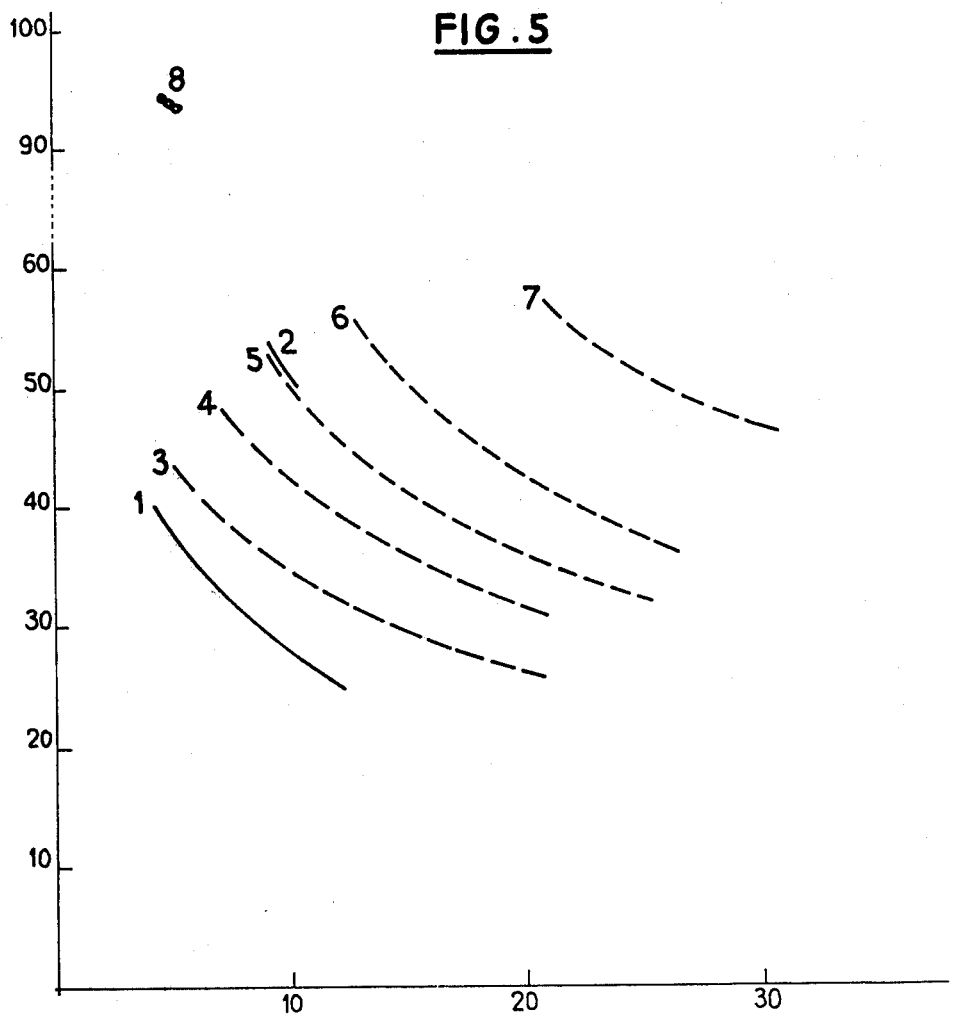

The results of these experiments are summarized in FIG. 5.

FIG. 5 represents the variations of the content in water of the acids which are recovered as a function of the residual acid content of the nitrocellulose washed by a variable number of washing operations according to the different processes.

Curves 1 and 2 represent the process according to the present invention carried out with 6 and 3 washings respectively.

Curves 3 through 7 represent the process in which washing is carried out counter-currently with 10, 6, 5, 4 and 2 washing respectively. Curve 8 represents the first conventional process.

The curves illustrate the substantial improvement achieved according to the process of the present invention. In order to achieve a nitrocellulose having a residual acid content of 10% one may operate for example by:
- 6 washings according to the process of the present invention and the acids recovered contain about 27% of water;
- 10 washings according to the counter-current process and the acids contain about 35% water.
- 6 washings according to the counter-current process and the acids contain about 42% water.

It is clear that the conventional process represented by curve 8 is of no interest because the water content of the acids which are removed is higher than 90%. The further concentration of these acids requires too much energy. Further the general performance of the process according to the present invention is substantially superior to the processes in which washings is carried out counter-currently. In fact the process according to the present invention permits to achieve with a predetermined number of washing operations a nitrocellulose having a predetermined residual acid content and with a water content of the acids which are recovered of predetermined value.

The same residual acid content may be achieved by the counter-current process by using:
- the same number of washing operations but with water content of the residual acid being substantially greater. In this manner the cost of concentrating the acids which are recovered is also substantially higher.
- a greater number of washings with the water content of the acids decreasing but remaining higher than the water content obtained in accordance with the process of the present invention. The cost of concentrating the acids which are recovered is, therefore, always higher and in addition the required investments in order to carry out the washing operations will be substantially higher.

What is claimed is:

1. A process of washing a solid product impregnated with a liquid substance which must be removed by contacting said solid product with a washing liquid, which comprises subjecting said product to sequences of successive washing operations comprising at least a first and a last washing operation in a washing zone and wherein:

(1) in the course of each sequence the successive washing operations are carried out with a washing liquid from a plurality of successive washing circuits, each circuit including at least one plugged tank external to the washing zone and at least one reservoir external to the washing zone, each circuit corresponding to a separate washing operation, the content of the substance to be eliminated therein decreasing from the first washing operation towards the last washing operation;

(2) during each sequence a quantity of liquid rich in the substance to be eliminated is removed from the washing liquid used during the first washing operation and an equivalent amount of the liquid free of the substance to be eliminated is introduced into the washing liquid used during the last washing operation;

(3) during each washing operation of the same sequence a quantity of washing liquid is used, the quantity of liquid rich in the substance to be eliminated in step (2) being small with respect to the quantity of washing liquid in step (3), a substantial quantity of the washing liquid being recovered to carry out the corresponding washing operation during the following sequence and with the exception of the first washing operation, a small quantity of this washing liquid is transferred into the washing liquid corresponding to a preceding washing operation of the same sequence whereby the content of the substance to be eliminated is maintained constant in said washing liquid in each circuit for the following sequence;

(4) each washing operation is carried out with a substantial quantity of washing liquid, said washing liquid being almost totally recovered in order to carry out the washing;

(5) the product to be washed being subjected to discontinuous washing operations by successively transferring the washing liquid into contact with the product in the washing zone from each reservoir and recycling said washing liquid to a plugged tank in the same circuit.

2. A continuous process of washing nitrocellulose prepared by reaction of cellulose with a mixture of sulfuric acid and nitric acid and which is impregnated with said acids, which consists of subjecting said nitrocellulose to sequences of successive washing operations with a washing liquid comprising at least a first and last washing operation in a washing zone without any cocurrent movement of the washing liquid with respect to the nitrocellulose to be washed, and wherein:

(1) in the course of the same sequence the successive washing operations are carried out with a washing liquid the content of the acids to be eliminated therein decreasing from the first washing operation towards the last washing operation;

(2) during each sequence a quantity of liquid rich in the acids is removed from the washing liquid used during the first washing operation and an equivalent amount of the liquid free of the acids is introduced into the washing liquid used during the last washing operation;

(3) during each washing operation of the same sequence a quantity of washing liquid is used, the quantity of liquid rich in the acids to be eliminated in (2) above being small with respect to the quantity of washing liquid in (3), a substantial quantity of the washing liquid being recovered to carry out the corresponding washing operation during the following sequence and with the exception of the first washing operation, a small quantity of this washing liquid is transferred into the washing liquid corresponding to a preceeding washing operation of the same sequence whereby the content of the acids is maintained constant in said washing liquid in each washing operation for the following sequence and wherein (4) each washing operation is carried out in a particular washing zone with the nitrocellulose to be washed being successively moved into each particular washing zone;

(5) in each zone the washing is carried out with a quantity of the washing liquid which is almost totally recycled in the same zone thus forming a washing circuit, the washing circuits in all the zones being arranged in series;

(6) the quantity of the washing liquid which circulates counter-currently from the last zone towards the first zone establishes a communication between the successive washing circuits;

(7) in each washing zone the small amount of liquid which circulates counter-currently is introduced into the washing circuit at a point which is downstream, with respect to the direction of flow of the nitrocellulose to be washed, of the point at which the washing liquid is placed in contact with said nitrocellulose and downstream of the point at which the small amount of liquid which flows counter-currently and which is directed towards the preceeding washing zone is extracted, said liquid flowing counter-currently with respect to the direction of movement of the nitrocellulose.

3. The process according to claim 1 wherein said nitrocellulose being washed is a fibrous product impregnated with its mother liquid.

* * * * *